(12) United States Patent
Yoshikawa et al.

(10) Patent No.: US 8,151,764 B2
(45) Date of Patent: Apr. 10, 2012

(54) ENGINE CONTROL SYSTEM

(75) Inventors: Hisayo Yoshikawa, Nagoya (JP); Masahiro Ito, Toyota (JP); Kenji Kasashima, Nishikamo-gun (JP)

(73) Assignees: Denso Corporation, Kariya, Aichi-Pref. (JP); Toyota Jidosha Kabushiki Kaisha, Toyota, Aichi-Pref. (JP)

( * ) Notice: Subject to any disclaimer, the term of this patent is extended or adjusted under 35 U.S.C. 154(b) by 765 days.

(21) Appl. No.: 12/280,059

(22) PCT Filed: Jan. 25, 2007

(86) PCT No.: PCT/JP2007/051656
§ 371 (c)(1),
(2), (4) Date: Aug. 20, 2008

(87) PCT Pub. No.: WO2007/097167
PCT Pub. Date: Aug. 30, 2007

(65) Prior Publication Data
US 2010/0162993 A1  Jul. 1, 2010

(30) Foreign Application Priority Data

Feb. 21, 2006 (JP) ................. 2006-043415

(51) Int. Cl.
*F02D 9/08* (2006.01)
*F02D 11/10* (2006.01)
(52) U.S. Cl. ...................... 123/337; 123/399
(58) Field of Classification Search .............. 123/337, 123/398, 399, 295, 403, 480; 701/101, 102, 701/114
See application file for complete search history.

(56) References Cited

U.S. PATENT DOCUMENTS

| 5,629,852 | A  | * | 5/1997  | Yokoyama et al. | 701/101 |
| 6,012,431 | A  | * | 1/2000  | Itoyama et al.  | 123/480 |
| 6,079,387 | A  |   | 6/2000  | Mamiya et al.   |         |
| 6,145,489 | A  | * | 11/2000 | Kazama et al.   | 123/295 |
| 6,178,943 | B1 | * | 1/2001  | Taga et al.     | 123/295 |
| 6,443,120 | B2 | * | 9/2002  | Shibagaki       | 123/295 |
| 6,497,214 | B2 |   | 12/2002 | Yagi            |         |

(Continued)

FOREIGN PATENT DOCUMENTS
EP     0 893 590     1/1999
(Continued)

OTHER PUBLICATIONS

International Search Report for PCT/JP2007/051656, mailed May 7, 2007.
(Continued)

*Primary Examiner* — John T. Kwon
*Assistant Examiner* — Johnny Hoang
(74) *Attorney, Agent, or Firm* — Nixon & Vanderhye PC (57) ABSTRACT

In an electronic throttle control system, a target intake pipe pressure as well as a presumed value for the intake pipe pressure is calculated, so that a deviation between the target value and the presumed value for the intake pipe pressure is calculated. The deviation is compensated in an advancing side by an amount corresponding to a delay of response in the throttle control system. An intake air amount passing through a throttle valve is calculated based on the above compensated deviation and a presumed intake air amount. A target opening degree of a throttle valve is finally calculated based on the above-calculated intake air amount passing through a throttle valve. Accordingly, a response and stability of the throttle control can be improved.

3 Claims, 10 Drawing Sheets

U.S. PATENT DOCUMENTS

| | | | | |
|---|---|---|---|---|
| 6,560,528 | B1* | 5/2003 | Gitlin et al. | 701/115 |
| 7,305,967 | B1* | 12/2007 | Hagari et al. | 123/403 |
| 7,603,980 | B2* | 10/2009 | Watanabe | 123/399 |
| 7,706,958 | B2* | 4/2010 | Itoga et al. | 701/108 |
| 2002/0078924 | A1 | 6/2002 | Yagi | |
| 2007/0068489 | A1 | 3/2007 | Osumi et al. | |
| 2007/0192015 | A1* | 8/2007 | Konishi | 701/102 |
| 2007/0255483 | A1* | 11/2007 | Tanaka | 701/101 |
| 2008/0033627 | A1* | 2/2008 | Tanaka | 701/102 |

FOREIGN PATENT DOCUMENTS

| | | |
|---|---|---|
| JP | 11-22515 | 1/1999 |
| JP | 2002-309990 | 10/2002 |

OTHER PUBLICATIONS

Written Opinion of the International Searching Authority for PCT/JP2007/051656, mailed May 7, 2007.

International Preliminary Report on Patentability for PCT/JP2007/051655, dated May 8, 2008.

Japanese Office Action dated Jun. 8, 2010, issued in corresponding Japanese Application No. 2006-043415, with English translation.

Chinese Office Action dated Dec. 14, 2010, issued in corresponding Chinese Application No. 200780006180.2, with English translation.

* cited by examiner

ENGINE CONTROL SYSTEM

This application is the U.S. national phase of International Application No. PCT/JP2007/051656, filed 25 Jan. 2007, which designated the U.S. and claims priority to Japan Application No. 2006-043415, filed 21 Feb. 2006, the entire contents of each of which are hereby incorporated by reference.

TECHNICAL FIELD

The present invention relates to a control system for an internal combustion engine having an electronic throttle system, in which a throttle valve is driven by an actuator.

BACKGROUND ART

In a recent electronic engine control system for a vehicle, for example, as disclosed in Japanese Patent Publication No. H11-22515, an engine torque (a target torque) demanded by a vehicle driver is calculated based on, for example, a stroke of an acceleration pedal operated by the driver, a target opening degree of a throttle valve is calculated from the target torque, and an actual opening degree of the throttle valve is controlled to be at the target opening degree, so that a drivability having a higher response to the acceleration pedal operation by the driver is realized.

In the above prior art (Japanese Patent Publication No. H11-22515) for the throttle control, the target torque is corrected so that the target opening degree of the throttle valve is calculated based on the corrected target torque, in view of useless time of the electronic throttle control system, a delay of a response for operating the throttle valve, a delay of an air flow for intake air in an intake air pipe, and so on.

As above, according to the above electronic throttle control system, the target torque is corrected to calculate the target opening degree of the throttle valve, in consideration of the useless time and the delay of the response of the system, as well as the delay of the air flow. However, according to a recent electronic throttle control system, a motion restriction is added to the control for the throttle valve, further in view of exhaust gas emission. As a result, an actual opening degree of the throttle valve (i.e. an intake air amount actually charged into an engine cylinder) is restricted by such motion restriction, when the target torque (a target intake air amount) is drastically changed in a stepwise manner. Then, the intake air amount is deviated from the target amount, resulting in deterioration of the response for the throttle control.

According to another prior art, for example, as disclosed in Japanese Publication No. 2002-201998, it has an object to improve control accuracy for an air-fuel ratio during a transition period. For that purpose, a delay is given to the target opening degree of the throttle valve. The opening degree of the throttle valve at a valve closing timing of an intake valve is estimated, based on the target opening degree of the throttle valve (before the delay is given) and a characteristic for a delay in response of the electronic throttle system. An intake air amount is calculated based on the above estimated opening degree of the throttle valve. And a fuel injection amount is calculated from the estimated intake air amount.

When it is compensated, in the above prior art (JP Publication No. 2002-201998), to reduce a deviation between the target value and the actual value, the compensation is carried out for not only the deviation but also the delay for the target opening degree of the throttle valve. A compensation gain may become too large and an overshoot for the opening degree of the throttle valve may occur. As a result, stability for the throttle control may be deteriorated.

DISCLOSURE OF THE INVENTION

The present invention is made in view of the above problems. It is an object of the present invention to provide an engine control system, according to which response and stability for the throttle control are improved.

According to a feature of the present invention, a target value for an intake air amount or an intake pipe pressure is calculated by a target value calculating means, and at the same time a presumed value for the intake air amount or the intake pipe pressure, which can be realized by an actual movement of the throttle valve, is also calculated by a presumed value calculating means. A target opening degree of a throttle valve is calculated by a throttle opening calculating means, based on a deviation between the target value and the presumed value.

According to the above feature, the presumed value for the intake air amount or the intake air pressure can be accurately calculated, which can be realized by the actual driving operation of the throttle valve, without having a delay in the throttle control, like the prior art as disclosed in Japanese Patent Publication No. 2002-201998. As a result, both of the response and stability can be improved in the throttle control operation.

Furthermore, since the presumed intake air amount as well as the presumed intake air pressure can be calculated by use of the reversed model of the intake air system, the presumed values can be obtained by such a process in which the parameters (e.g. air charging efficiency "$\eta$") of the model for the intake air system can be directly used. Accordingly, man power for matching the parameters to the respective engine types can be reduced.

According to another feature of the present invention, the presumed value calculating means preferably calculates the presumed value for the intake air amount or the intake pipe pressure, based on a throttle opening degree, to which a motion restriction is applied with respect to a control for the throttle valve.

A motion restriction is applied to a driving operation for a throttle valve in view of exhaust gas emission. According to such a feature, however, the presumed value for the intake air amount or the intake pipe pressure is calculated as such a value, which can be realized by the actual driving operation for the throttle valve (to which the motion restriction is applied). Therefore, the presumed value can be accurately calculated.

According to a further feature of the present invention, the presumed value calculating means calculates the presumed value for the intake air amount or the intake pipe pressure, based on the throttle opening degree, to which the motion restriction is applied, wherein a delay of response in an intake air system is taken into consideration. And the throttle opening calculating means comprises;

a calculating means for calculating a deviation between the target intake pipe pressure and the presumed intake pipe pressure;

a compensating means for compensating the deviation for the intake pipe pressure to an advancing side by an amount corresponding to the delay of the response in the intake air system;

a calculating means for calculating an intake air amount passing through the throttle valve, based on the deviation compensated in the advancing side and the presumed intake air amount;

a calculating means for calculating a throttle opening degree based on the calculated intake air amount passing through the throttle valve, such that the intake air amount passing through the throttle valve is realized by the throttle opening degree; and a calculating means for calculating the target opening degree for the throttle valve by applying a motion restriction to the calculated throttle opening degree.

According to such a feature, both of the response and stability can be improved in the throttle control operation, even in the case that the motion restriction is applied to the driving operation for the throttle valve and there is the delay of response in the intake air system.

BRIEF DESCRIPTION OF THE DRAWINGS

The above and other objects, features and advantages of the present invention will become more apparent from the following detailed description made with reference to the accompanying drawings. In the drawings.

BEST MODES FOR CARRYING OUT THE INVENTION

An embodiment of the present invention will be explained. A structure of an engine control system will be explained with reference to FIG. 1. An air cleaner 13 is provided at an upstream end of an air intake pipe 12 of an engine 11 (an internal combustion engine of a direct fuel injection type). An air-flow meter 14 is provided at a downstream side of the air cleaner 13, for detecting an amount of intake air to the engine 11. A throttle valve 16 and a throttle valve sensor 17 are provided at a downstream side of the air-flow meter 14, wherein an opening degree of the throttle valve 16 is controlled by an electric motor 15 of an electronic throttle control system, and the sensor 17 detects the opening degree of the throttle valve 16 (hereinafter also referred to as "the throttle opening degree").

Figure 1:
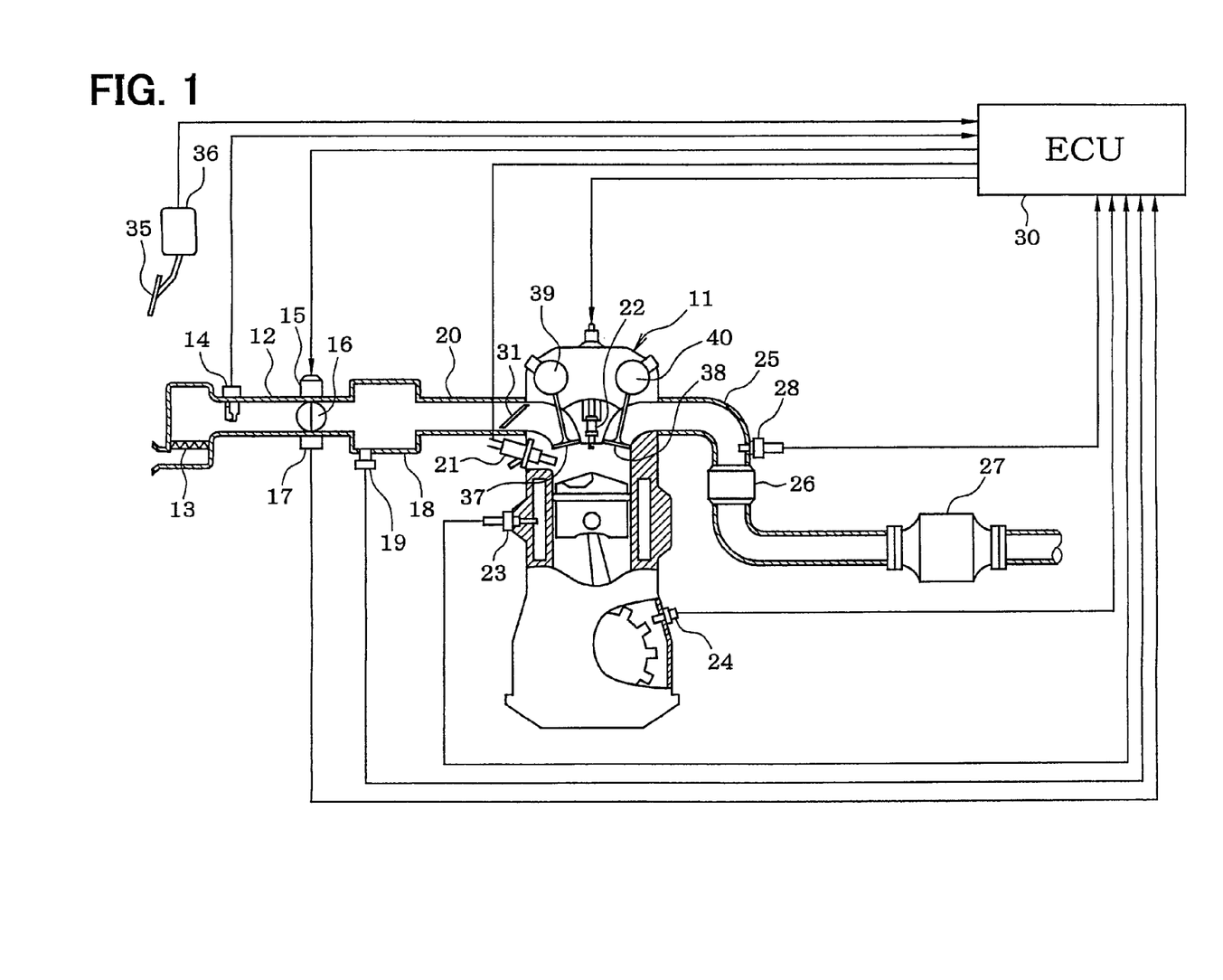
FIG. 1 is a schematic view showing a structure of an engine control system according to an embodiment of the present invention.

A surge tank 18 is further provided at a downstream side of the throttle valve 16, and a pressure sensor 19 for detecting intake air pressure (i.e. the intake pipe pressure) is provided at the surge tank 18. Multiple intake manifolds 20 are connected to the surge tank 18, for introducing the intake air into respective cylinders of the engine 11. An air-stream control valve 31 is provided in each of the intake manifolds 20 for controlling strength of the air-stream in each cylinder (strength of swirl stream, strength of tumble stream, etc.).

A fuel injection valve 21 is provided at an upper portion of the respective cylinders, so that fuel is directly injected into the cylinder (a combustion chamber). A spark plug 22 is mounted to a cylinder head of the engine 11 for the respective cylinders, so that air-fuel mixture in each of the cylinders is ignited by spark discharge at the spark plug 22. Valve timing variable devices 39, 40 are provided to change opening and/or closing timing of an intake valve 37 and an exhaust valve 38.

A temperature sensor 23 is provided at a cylinder block of the engine 11 for detecting temperature of engine cooling water. A crank angle sensor 24 is also provided at an outer peripheral portion of a crank shaft (not shown) for outputting pulse signals for every angular rotation of the crank shaft by a predetermined angle. The crank angle as well as engine rotational speed is detected based on the output signals from the crank angle sensor 24.

An upstream side catalyst 26 and a downstream side catalyst 27 are provided in an exhaust gas pipe 25 of the engine 11 for purifying the exhaust gas. An exhaust gas sensor 28 (e.g. an air-fuel ratio sensor, an oxygen sensor, or the like) is provided at an upstream side of the upstream side catalyst 26 for detecting air-fuel ratio, a rich condition, or a lean condition of the exhaust gas. An operational stroke (an opening degree) of an acceleration pedal 35 is detected by an acceleration sensor 36.

The output signals from the above sensors are inputted to an engine control unit (ECU) 30, which is composed of a micro-computer to perform engine control programs memorized in the memory device (ROM). An intake air amount is controlled by setting a target opening degree of the throttle valve 16 (also referred to as "the target throttle opening degree"), so that an output torque of the engine 11 is controlled to be a target torque (a demanded torque).

Figure 2:
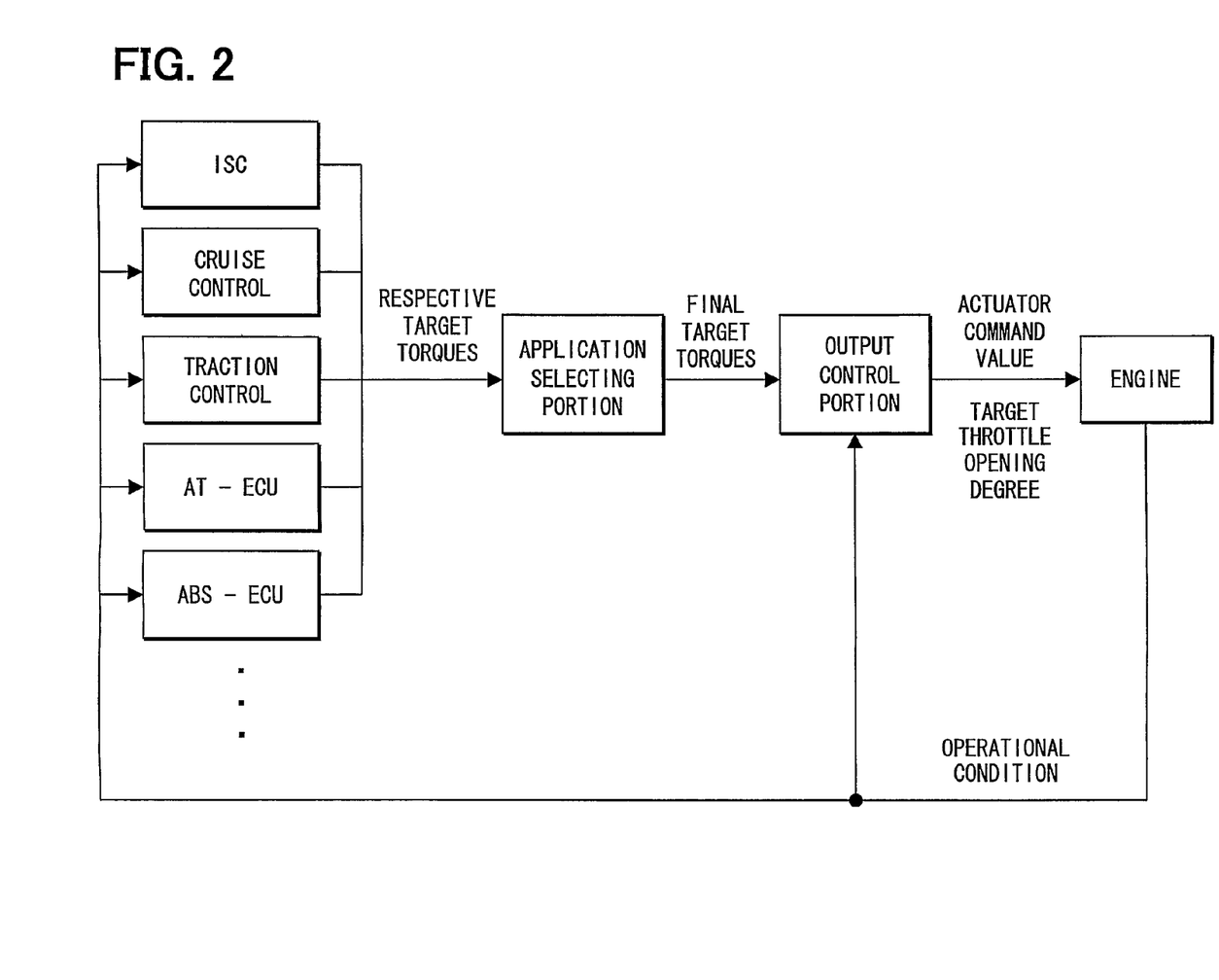
FIG. 2 is a block diagram showing an overview of the engine control system.

According to the embodiment of the invention, as shown in FIG. 2, an application selecting portion 41 selects a final target torque from target torques respectively set by an idle speed control (ISC) portion, a cruise control portion, a traction control portion, an automatic transmission control portion (AT-ECU), an anti-block braking control portion (ABS-ECU), and so on. An output control portion 42 calculates an actuator command value (i.e. the target opening degree of the throttle valve) in accordance with the selected final target torque. The actuator command value is outputted to the engine 11, so that the intake air amount is controlled in order that the output torque of the engine 11 becomes equal to the target torque.

Figure 3:
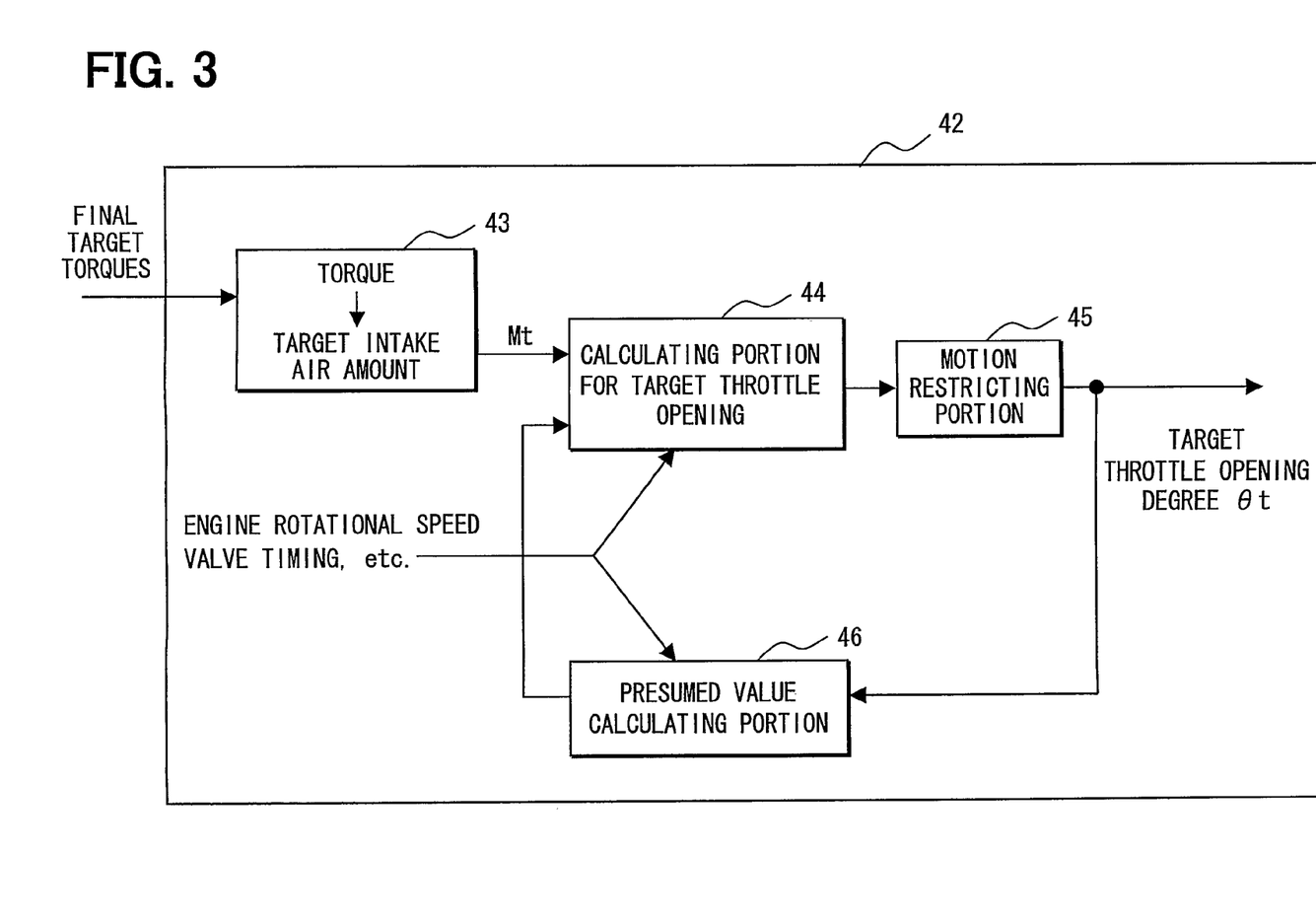
FIG. 3 is a block diagram for explaining a function of an output control portion of the engine control system.

As shown in FIG. 3, the output control portion 42 has a target value calculating portion 43 for converting the final target torque to a target intake air amount "Mt", and a calculating portion 44 for calculating the target throttle opening degree from the target intake air amount "Mt". The output control portion 42 further has a motion restricting portion 45 for restricting the target throttle opening degree "θt" by a guard process for upper and lower limits as well as a guard process for a driving speed or a driving acceleration of the throttle valve 16. The guard process is done in view of an emission control, a driving performance of the motor 15 of the electronic throttle control system and so on. The output control portion 42 further has a presumed value calculating portion 46 for calculating presumed values (Pmest, Mtest) for the intake air amount and the intake pipe pressure (i.e. the intake air pressure), which can be achieved by the target throttle opening degree "θt", to which the motion restriction is applied (the guard process is carried out for the target throttle opening degree "θt").

Figure 4:
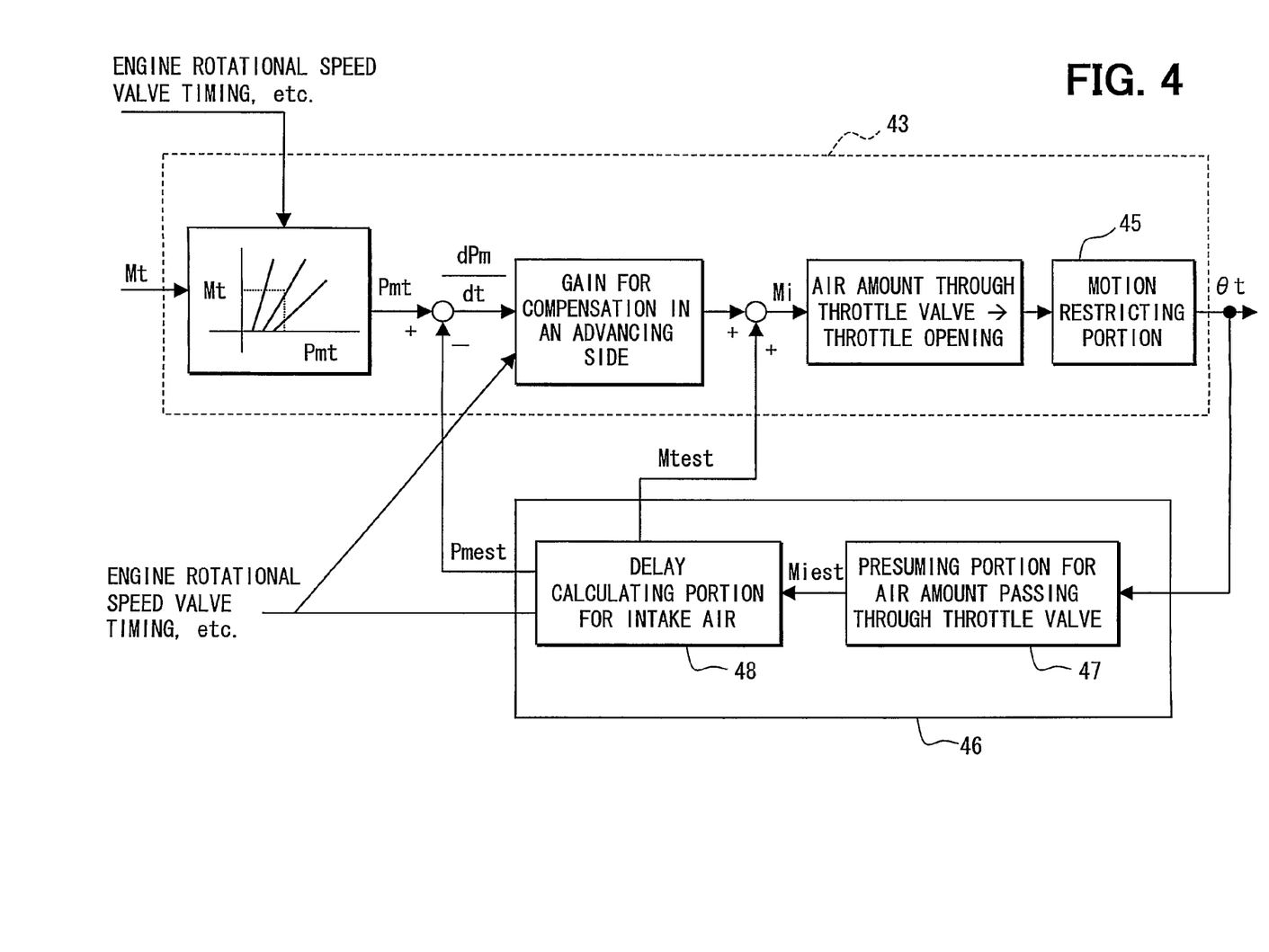
FIG. 4 is a block diagram for explaining a function of calculating a target opening degree of a throttle valve.
Figure 7:
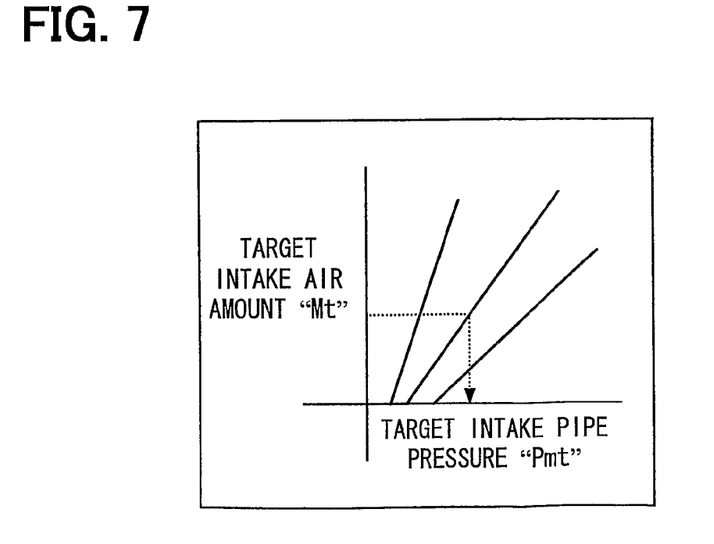
FIG. 7 is a conceptual diagram showing a map for converting a target intake air amount "Mt" to a target intake pipe pressure "Pmt"

As shown in FIG. 4, the calculating portion 44 calculates a target intake pipe pressure "Pmt", which realizes the target intake air amount, from a map (shown in FIG. 7) showing the target intake pipe pressure "Pmt" with respect to a parameter of the target intake air amount "Mt". In the map (FIG. 7), the target intake pipe pressure "Pmt" and the target intake air amount "Mt" are in a linear relation. Furthermore, in the map (FIG. 7) for the purpose of converting the target intake air amount "Mt" to the target intake pipe pressure "Pmt", other engine operational conditions, such as engine rotational speed, valve timings for the intake and exhaust valves, and so on, are used as parameters. This is because the relation between the target intake air amount "Mt" and the target intake pipe pressure "Pmt" varies depending on the engine operational conditions, such as the engine rotational speed, the valve timings for the intake and exhaust valves, and so on.

Then, the calculating portion 44 calculates a deviation "dPm" (=Pmt−Pmest) between the target intake pipe pressure "Pmt", which is calculated from the map, and the presumed intake pipe pressure "Pmest", which is calculated by the presumed value calculating portion 46. A compensation amount is calculated, as in the following formula 1, to compensate the deviation "dPm" in an advancing direction by a gain for advance compensation, which corresponds to a delay of the intake air from the throttle valve 16 to the surge tank 18.

Compensation Amount for delay [Formula 1]

of intake air to be charged to surge tank =

$$\frac{V}{\kappa \cdot R \cdot Tmp} \cdot \frac{dPm}{dt} \left( \frac{dPm}{dt} = \frac{Pmt - Pmest}{dt} \right)$$

In the above formula 1, "κ" is a ratio of specific heat for the intake air, "R" is a gas constant for the intake air, "Tmp" is a temperature of the intake air, and "V" is a volume of an intake air passage from the throttle valve 16 to the surge tank 18.

"dPm/dt" is a differentiated value of the deviation "dPm" (=Pmt−Pmest) between the target intake pipe pressure and the presumed intake pipe pressure, which is differentiated by time.

Furthermore, the calculating portion 44 calculates an air amount "Mi" passing through the throttle valve, as in the following formula 2, by adding the above compensation amount to the presumed intake air amount "Mtest", which is calculated by the presumed value calculating portion 46.

$$Mi = Mtest + \frac{V}{\kappa \cdot R \cdot Tmp} \cdot \frac{dPm}{dt} \quad \text{[Formula 2]}$$

The above formula 2 represents a reversed model of an intake air system model, which simulates a delay of the intake air passing through the throttle valve 16 and to be charged into the surge tank 18.

The calculating portion 44 calculates the target opening degree of the throttle valve based on the air amount "Mi" passing through the throttle valve, in order to realize the air amount "Mi". The target opening degree of the throttle valve is restricted by the guard process of the motion restricting portion 45, such that the upper and lower limits are provided and the driving speed or the driving acceleration of the throttle valve 16 is restricted. Then, the final value "θt" for the target throttle opening degree is obtained, and the target throttle opening degree "θt" is outputted to a motor driving circuit (not shown) of the electronic throttle control system.

The presumed value calculating portion 46 has a presuming portion 47 for presuming an air amount "Miest" passing through the throttle valve, wherein the air amount "Miest" is such a presumed air amount which can be realized by the above target throttle opening degree "θt". The presumed value calculating portion 46 further has a delay calculating portion 48 for the intake air, which calculates a presumed intake air amount "Mtest" and a presumed intake pipe pressure "Pmest" from the presumed air amount "Miest" passing through the throttle valve based on the intake air system model, which simulates the delay of the intake air passing through the throttle valve 16 and to be charged into the surge tank 18.

The presuming portion 47 calculates the presumed air amount "Miest" passing through the throttle valve according to the following formula 3.

$$Miest = \frac{\mu \cdot Pa \cdot \phi}{\sqrt{R \cdot Tmp}} \cdot At \quad \text{[Formula 3]}$$

Figure 8:
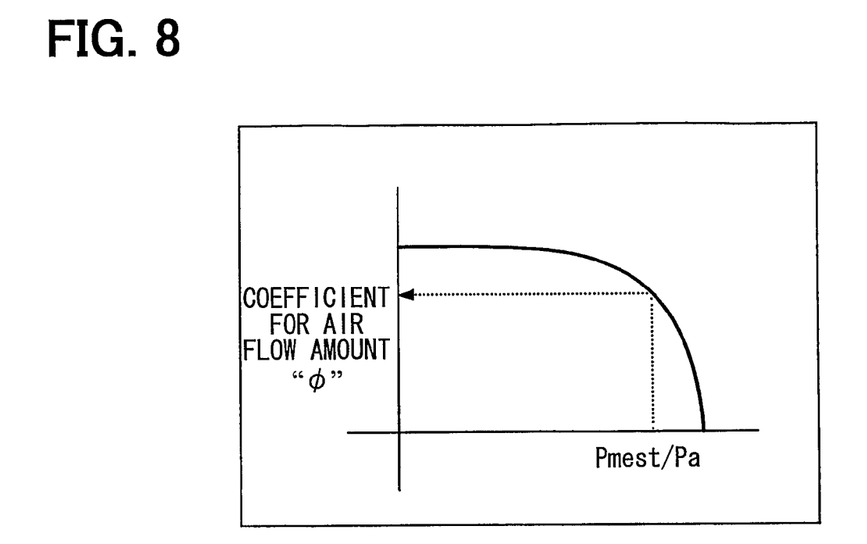
FIG. 8 is a conceptual diagram showing a map for calculating a flow rate coefficient "+" from a ratio (Pmest/Pa) between a presumed intake pipe pressure "Pmest" and the atmospheric pressure "Pa"

In the above formula, "μ" is a matching coefficient for the air flow amount, "Pa" is the atmospheric pressure, "φ" is a coefficient for the air flow amount defined by a ratio (Pmest/Pa) between the presumed intake pipe pressure "Pmest" and the atmospheric pressure "Pa", as shown in FIG. 8. "At" is an opening area of the throttle valve corresponding to the target throttle opening degree "θt".

The delay calculating portion 48 for the intake air calculates the presumed intake pipe pressure "Pmest" from the presumed air amount "Miest", according to a formula of the intake air system model, which is represented by the following formula 4:

$$\frac{dPmest}{dt} = \frac{\kappa \cdot R \cdot Tmp}{V}(Miest - Mtestold) \quad \text{[Formula 4]}$$

$$dPmest = Pmest - Pmestold$$

$$= dt \cdot \frac{\kappa \cdot R \cdot Tmp}{V}(Miest - Mtestold)$$

$$Pmest = Pmestold + dt \cdot \frac{\kappa \cdot R \cdot Tmp}{V}(Miest - Mtestold)$$

Figure 5:
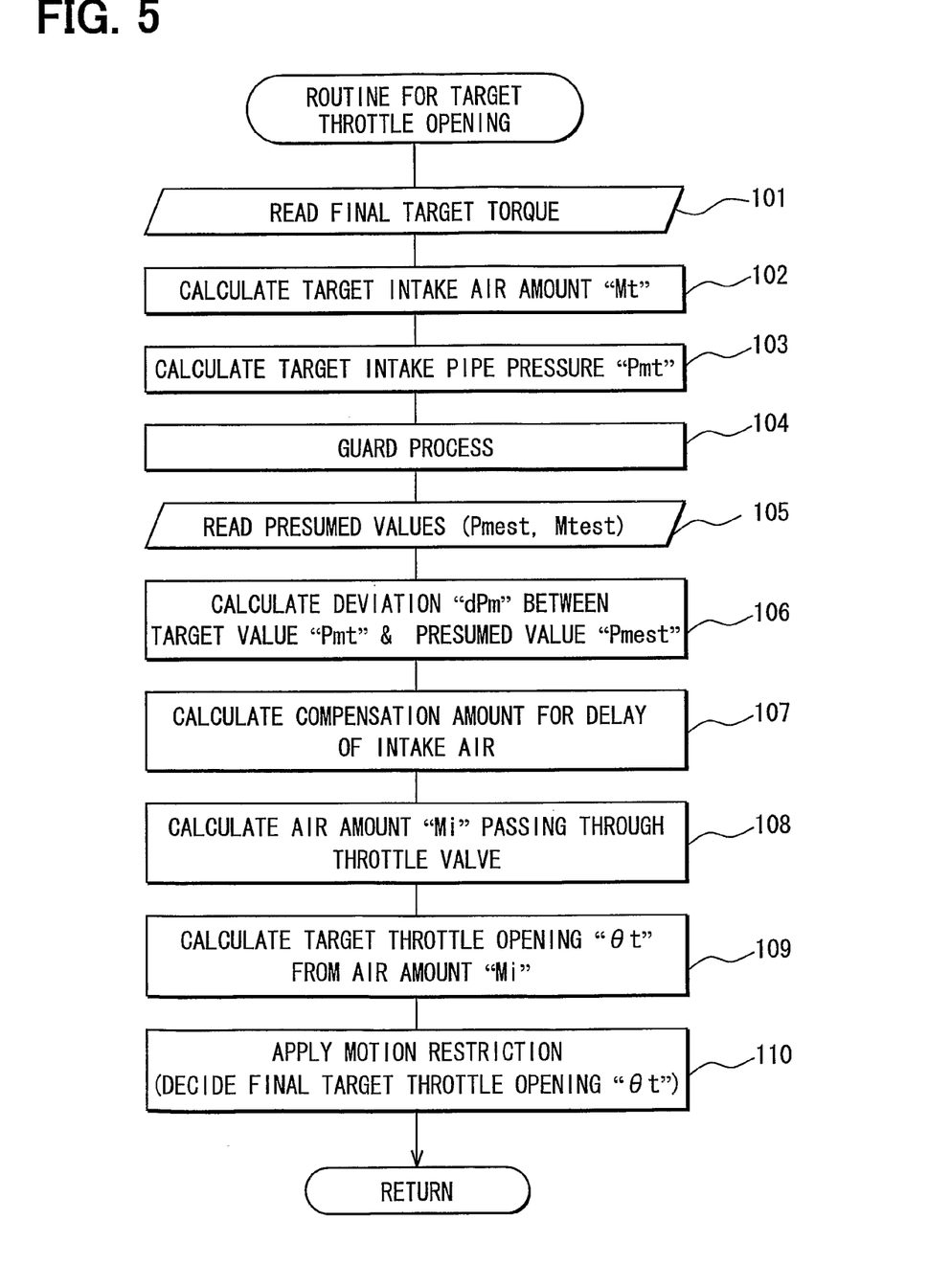
FIG. 5 is a flow chart showing a process for calculating the target opening degree of the throttle valve.

In the above formula 4, "Pmestold" is the presumed intake pipe pressure of the previous cycle for the routine shown in FIG. 5. "Mtestold" is likewise the presumed intake air amount of the previous cycle. "dt" is a calculation cycle.

Figure 10:
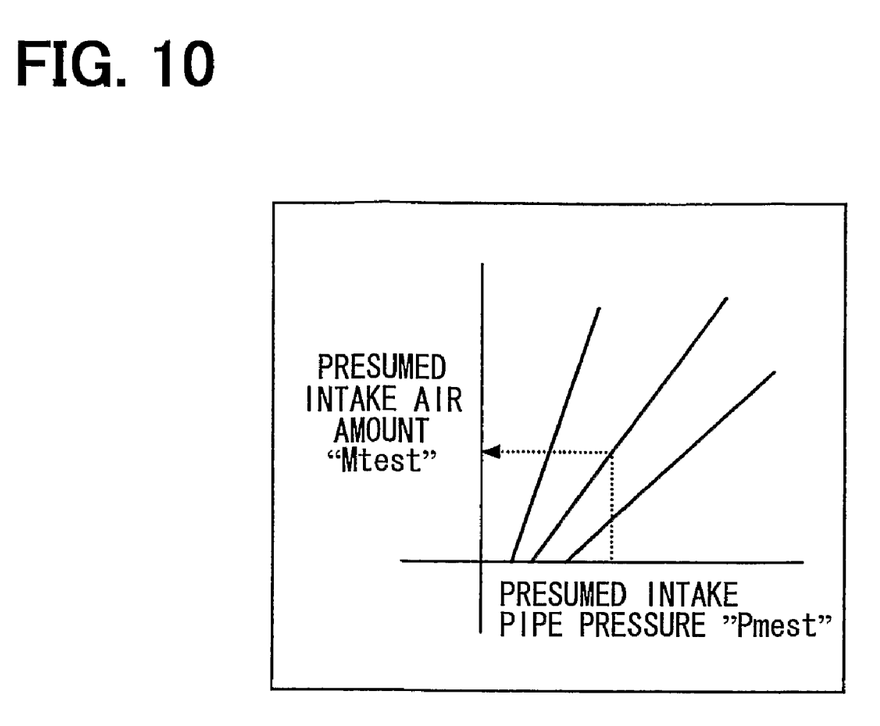
FIG. 10 is a conceptual diagram showing a map for converting the presumed intake pipe pressure "Pmest" to a presumed intake air amount "Mtest"

After the presumed intake pipe pressure "Pmest" of the current cycle is calculated according to the above formula 4, the presumed intake air amount "Mtest" corresponding to the presumed intake pipe pressure "Pmest" is calculated from a map (shown in FIG. 10). Since the relation between the presumed intake pipe pressure "Pmest" and the presumed intake air amount "Mtest" varies depending on the engine operational conditions, such as the engine rotational speed, the valve timings for the intake and exhaust valves, and so on, as in the same manner to the map of FIG. 7. Therefore, the map for the purpose of converting the presumed intake pipe pressure "Pmest" to the presumed intake air amount "Mtest" has the parameters including the engine operational conditions, such as the engine rotational speed, the valve timings for the intake and exhaust valves, and so on.

Figure 6:
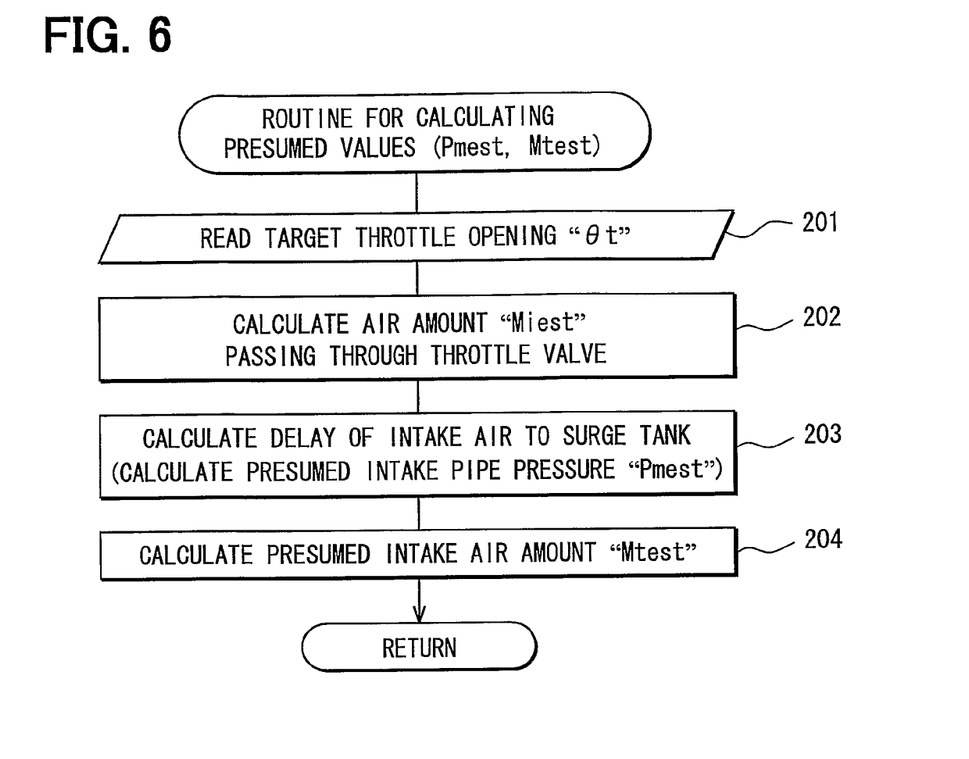
FIG. 6 is a flow chart showing a process for calculating presumed values ("Pmest", "Mtest")

The throttle control operation of the embodiment is carried out by the ECU 30 by performing the respective routines shown in FIGS. 5 and 6. The routines (processes) will be explained.

<Routine for Calculating the Target Throttle Opening Degree "θt">

The routine of FIG. 5 is repeatedly carried out at a predetermined cycle during an engine operation. When the routine starts, the output control portion 42 reads at a step 101 the final target torque, which is selected by the application selecting portion 41. At the next step 102, the output control portion 42 calculates the target intake air amount "Mt" from a two-dimensional map, which corresponds to the current engine rotational speed "Ne" and the final target torque. Then, the process goes to a step 103, at which the output control portion 42 calculates the target intake pipe pressure "Pmt", which is necessary to realize the target intake air amount "Mt", from the map (shown in FIG. 7) showing the target intake pipe pressure "Pmt" with respect to the parameter of the target intake air amount "Mt".

As already explained, since the relation between the intake air amount and the intake pipe pressure "Pm" varies depending on the engine operational conditions, such as the engine rotational speed, the valve timings for the intake and exhaust valves, and so on, the map (FIG. 7) for the purpose of converting the target intake air amount "Mt" to the target intake pipe pressure "Pmt", has the parameters including the engine operational conditions, such as engine rotational speed, valve timings for the intake and exhaust valves, and so on.

The process goes to a step 104, at which the output control portion 42 (the motion restricting portion 45) carries out the guard process, such that the target intake pipe pressure "Pmt" comes within a pressure range which can be realized under the current atmospheric pressure. Then, the process further goes to a step 105, at which the output control portion 42 (the calculating portion 44) reads the presumed intake pipe pressure "Pmest" and the presumed intake air amount "Mtest", which will be calculated in accordance with the routine of FIG. 6 (explained below), and the process moves on to a step 106, at which the calculating portion 44 calculates the deviation "dPm" (=Pmt−Pmest) between the target intake pipe pressure "Pmt" and the presumed intake pipe pressure "Pmest".

The process further moves on to a step 107, at which the calculating portion 44 calculates the compensation amount, according to the formula 1, for compensating the deviation "dPm" to the advancing side by an amount corresponding to the delay of the intake air from the throttle valve 16 to the surge tank 18 (i.e. the delay of the intake air to be charged into the surge tank).

Then, the process goes to a step 108 to calculate the air amount "Mi" passing through the throttle valve, by adding the above compensation amount to the presumed intake air amount "Mtest".

The process goes to a step 109 to calculate the target throttle opening degree "θt", which is necessary to realize the air amount "Mi" passing through the throttle valve, in accordance with the following manner. At first, the opening area "At" of the throttle valve, which is necessary to realize the air amount "Mi" passing through the throttle valve, is calculated according to the following formula 5:

$$At = Mi \cdot \frac{\sqrt{R \cdot Tmp}}{\mu \cdot Pa \cdot \phi} \qquad \text{[Formula 5]}$$

In the above formula 5, the coefficient "φ" for the air flow amount is calculated based on, for example, the map shown in FIG. 8, in accordance with the ratio (Pmest/Pa) between the presumed intake pipe pressure "Pmest" and the atmospheric pressure "Pa".

Figure 9:
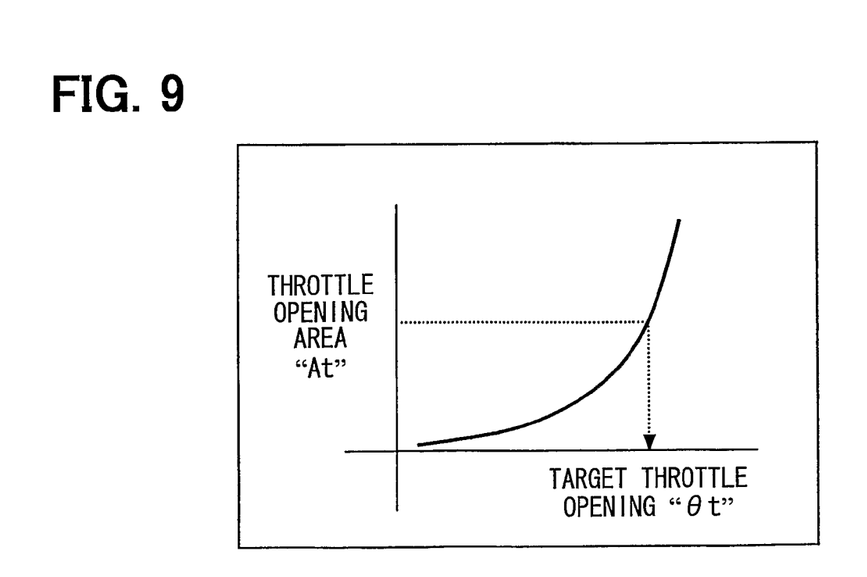
FIG. 9 is a conceptual diagram showing a map for converting an opening area "At" of the throttle valve to the target throttle opening degree "θt" of the throttle valve.

The output control portion 42 converts the opening area "At" of the throttle valve (calculated according to the above formula 5) to the target throttle opening degree "θt", for example, in accordance with the map shown in FIG. 9.

Then, the process goes to a step 110, at which the target opening degree of the throttle valve is restricted by the guard process (e.g. the upper and lower limits are provided and the driving speed or the driving acceleration of the throttle valve 16 is restricted), so that the final value "θt" for the target throttle opening degree is obtained.

<Routine for Calculating the Presumed Values (Pmest, Mtest)>

The routine of FIG. 6 is also repeatedly carried out at a predetermined cycle during the engine operation. When the routine starts, the presumed value calculating portion 46 reads at a step 201 the final (current) target throttle opening degree "θt", for which the movement of the throttle valve is restricted. Then, at the next step 202, the presumed value calculating portion 46 presumes the presumed air amount "Miest", which can be realized by the above target throttle opening degree "θt".

In this process, the target throttle opening degree "θt" is converted to the opening area "At" of the throttle valve, based on a map similar to that of FIG. 9. The presumed air amount "Miest" is calculated according to the formula 3, in which the above opening area "At" of the throttle valve is applied.

Then, the process goes to a step 203, at which the presumed value calculating portion 46 calculates a variation "dPmest" of the intake pipe pressure per the calculating cycle "dt", based on a difference (Miest−Mtestold) between the presumed intake air amount "Mtestold" of the previous cycle and the presumed air amount "Miest" of the current cycle. And the presumed value calculating portion 46 calculates the presumed intake pipe pressure "Pmest" of the current cycle, by adding the above variation "dPmest" to the presumed intake pipe pressure "Pmestold" of the previous cycle.

The process further goes to a step 204, at which the presumed value calculating portion 46 calculates the presumed intake air amount "Mtest" corresponding to the presumed intake pipe pressure "Pmest" in accordance with the map (shown in FIG. 10).

The relation between the presumed intake air amount "Mtest" and the presumed intake pipe pressure "Pmest" varies depending on the engine operational conditions, such as the engine rotational speed, the valve timings for the intake and exhaust valves, and so on. Therefore, the map (FIG. 10) for the purpose of converting the presumed intake pipe pressure "Pmest" to the presumed intake air amount "Mtest" has the parameters including the engine operational conditions, such as engine rotational speed, valve timings for the intake and exhaust valves, and so on.

The effects of the embodiment of the present invention will be explained with reference to FIGS. 11 and 12.

Figure 11:
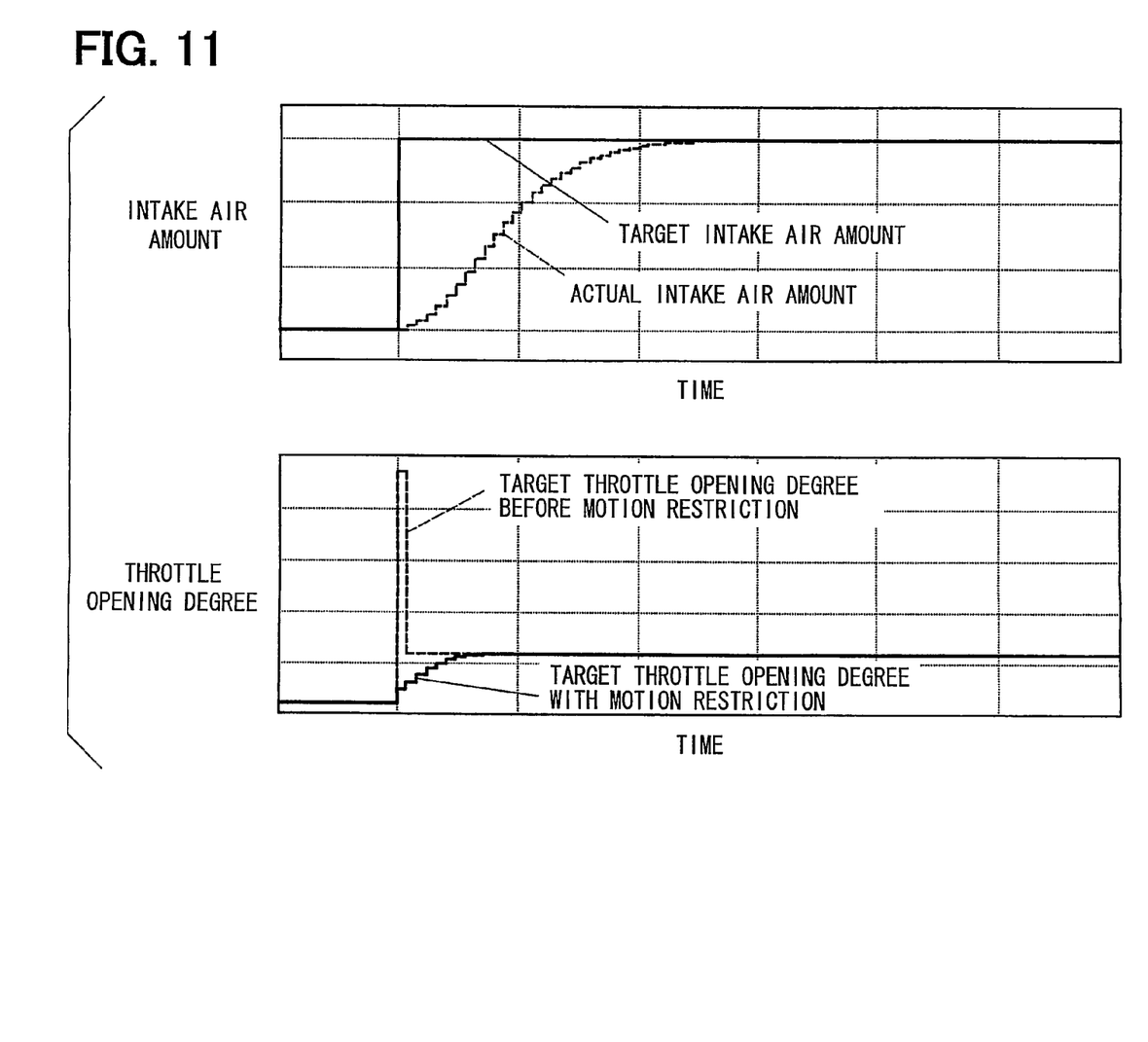
FIG. 11 is a time chart showing an example for controlling a throttle opening degree when an intake air amount is changed in a stepwise manner, in which the target opening degree of the throttle valve is decided based on a general physical formula.

FIG. 11 is a time chart showing an example of a throttle control, in which an intake air amount is changed in a stepwise manner, and in which a target throttle opening degree is decided based on a general physical formula. FIG. 12 is a time chart showing the intake air amount and the throttle opening degree, in which the intake air amount is likewise changed in the stepwise manner but the target throttle opening degree is calculated according to the method of the embodiment of the invention.

In the case that the target throttle opening degree is calculated according to the general physical formula, the target throttle opening degree (i.e. the target throttle opening degree before applying the motion restriction), which is calculated according to the physical formula (the reversed model of the intake air system), is instantaneously increased, as shown in FIG. 11, when the target intake air amount is changed in the stepwise manner. Then, the target throttle opening degree is decreased at once to the target throttle opening degree for the steady state, which is the operational state reaching after the target intake air amount is changed. However, the target throttle opening degree is actually restricted by the guard process in view of the emission control, the driving performance of the motor 15 of the electronic throttle control system and so on. Therefore, even when the target intake air amount is changed in the stepwise manner, the target throttle opening degree (restricted by the guard process) is not instantaneously increased but gradually increased toward the target throttle opening degree for the steady state reaching after the target intake air amount is changed. Accordingly, a delay is likely to increase in the response of the actual intake air amount with respect to the stepwise change of the target intake air amount.

According to the present invention, however, the presumed values (Mtest, Pmest) for the intake air amount and the intake pipe pressure are calculated based on the target throttle opening degree "θt" (to which the motion restriction is applied), in consideration of the delay in the response. Then, the deviation "dPm" (=Pmt−Pmest) between the target intake pipe pressure "Pmt" and the presumed intake pipe pressure "Pmest" is calculated. And the air amount "Mi" passing through the throttle valve is calculated by compensating the deviation "dPm" to the advancing side by the amount corresponding to the delay of the response in the intake air system.

Furthermore, the throttle opening degree is calculated based on the air amount "Mi" passing through the throttle valve, and the motion restriction is applied to the calculated throttle opening degree in view of the emission and so on, to finally obtain the target throttle opening degree "θt".

Figure 12:
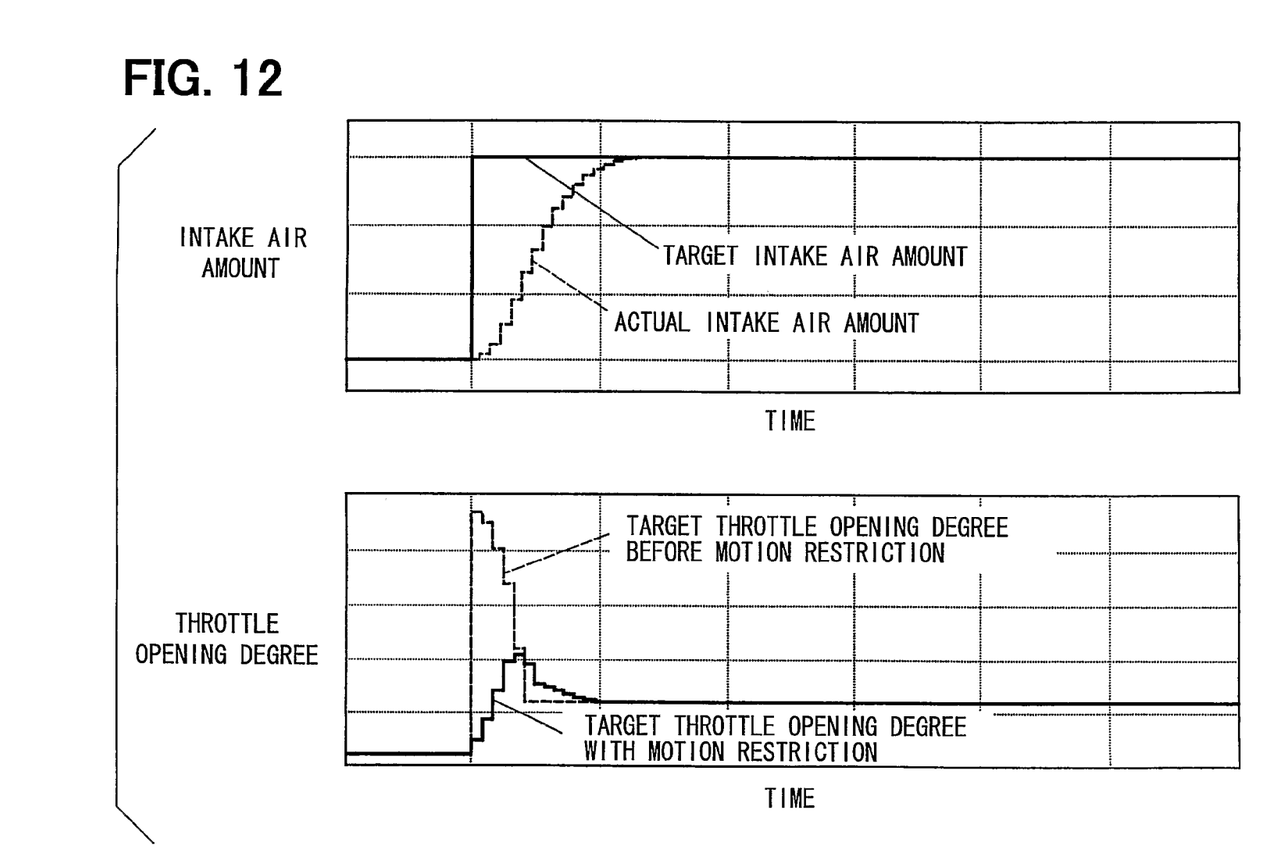
FIG. 12 is a time chart showing an example for controlling the throttle opening degree when the intake air amount is changed in the stepwise manner, in which the target opening degree of the throttle valve is calculated according to the method of the embodiment of the invention.

As a result, as shown in FIG. 12, the target throttle opening degree (i.e. the target throttle opening degree before applying the motion restriction) is instantaneously increased, when the target intake air amount is changed in the stepwise manner.

However, the target throttle opening degree is not decreased at once like FIG. 11, but gradually decreased with a proper inclination to the target throttle opening degree for the steady state reaching after the target intake air amount is changed. Accordingly, when the target intake air amount is changed in the stepwise manner, the target throttle opening degree (the target throttle opening degree with the motion restriction) is changed in such an overshooting manner that the target throttle opening degree is properly overshot beyond the target throttle opening degree for the steady state reaching after the target intake air amount is changed. Therefore, the delay in the response of the actual intake air amount with respect to the stepwise change of the target intake air amount can be improved.

Furthermore, according to the embodiment of the present invention, the presumed intake air amount "Mtest" as well as the presumed intake air pressure "Pmest" can be accurately calculated, wherein those presumed values can be realized by the actual driving operation of the throttle valve 16. The above effect can be obtained without having a delay in the throttle control, like the prior art as disclosed in Japanese Patent Publication No. 2002-201998. As a result, both of the response and stability (suppression of the overshoot) can be realized in the throttle control operation.

In addition, since the presumed intake air amount "Mtest" as well as the presumed intake air pressure "Pmest" can be calculated by use of the reversed model of the intake air system, the presumed values can be obtained by such a process in which the parameters (e.g. air charging efficiency "η") of the model for the intake air system can be directly used. Accordingly, man power for matching the parameters to the respective engine types can be reduced.

The present invention is not limitedly applied to the engine of the direct injection type, but may be applied to any other types of the engine, e.g. an engine of a port injection type. The present invention can be modified in various ways.

The invention claimed is:

1. An engine control system comprising:
an electronic throttle control system having a throttle valve and an actuator for driving the throttle valve, so that the throttle valve is controlled by the actuator in accordance with a target opening degree for the throttle valve;
a target value calculating means for calculating a target value for an intake air amount or an intake pipe pressure;
a target opening degree calculating means for calculating a target opening degree of the throttle valve; and
a presumed value calculating means for calculating a presumed value for the intake air amount or the intake pipe pressure, which can be realized by the calculated target opening degree,
wherein the target opening degree calculating means calculates the target opening degree of the throttle valve based on a deviation between the target value calculated by the target value calculating means and the presumed value calculated by the presumed value calculating means,
wherein the presumed value calculating means calculates the presumed value for the intake air amount or the intake pipe pressure, based on a target opening degree of the throttle valve, to which a motion restriction is applied with respect to a control for the throttle valve, and
wherein the presumed value calculating means calculates the presumed value for the intake air amount or the intake pipe pressure, based on the target opening degree of the throttle valve, to which the motion restriction is applied, wherein a delay of response in an intake air system is taken into consideration, and
the target opening degree calculating means comprises:
a calculating means for calculating a deviation between the target intake pipe pressure and the presumed intake pipe pressure;
a compensating means for compensating the deviation for the intake pipe pressure to an advancing side by an amount corresponding to the delay of the response in the intake air system;

a calculating means for calculating an intake air amount passing through the throttle valve, based on the deviation compensated in the advancing side and the presumed intake air amount;

a calculating means for calculating a throttle opening degree based on the calculated intake air amount passing through the throttle valve, such that the intake air amount passing through the throttle valve is realized by the throttle opening degree; and a calculating means for calculating the target opening degree for the throttle valve by applying a motion restriction to the calculated throttle opening degree.

2. In an engine control system comprising an electronic throttle control system having a throttle valve an actuator for driving the throttle valve, and an electronic control unit, wherein the throttle valve is controlled by the actuator in accordance with a target opening degree for the throttle valve, a method for controlling an operation for the engine control system, said method comprising:

a target value calculating step for calculating a target value for an intake air amount or an intake pipe pressure;

a target opening degree calculating step for calculating a target opening degree of the throttle valve; and a presumed value calculating step for calculating a presumed value for the intake air amount or the intake pipe pressure, which can be realized by the calculated target opening degree, wherein, at the target opening degree calculating step, the target opening degree of the throttle valve is calculated based on a deviation between the target value calculated by the target value calculating step and the presumed value calculated by the presumed value calculating step, wherein the electronic control unit calculates, at the presumed value calculating step, the presumed value for the intake air amount or the intake pipe pressure, based on the target opening degree of the throttle valve, to which a motion restriction is applied with respect to a control for the throttle valve, wherein the electronic control unit calculates, at the presumed value calculating step, the presumed value for the intake air amount or the intake pipe pressure, based on the throttle opening degree, to which the motion restriction is applied, and wherein a delay of response in an intake air system is taken into consideration, and the target opening degree calculating step further comprises:

a calculating step for calculating a deviation between the target intake pipe pressure and the presumed intake pipe pressure;

a compensating step for compensating the deviation for the intake pipe pressure to an advancing side by an amount corresponding to the delay of the response in the intake air system;

a calculating step for calculating an intake air amount passing through the throttle valve, based on the deviation compensated in the advancing side and the presumed intake air amount;

a calculating step for calculating a throttle opening degree based on the calculated intake air amount passing through the throttle valve, such that the intake air amount passing through the throttle valve is realized by the throttle opening degree; and a calculating step for calculating the target opening degree for the throttle valve by applying a motion restriction to the calculated throttle opening degree.

3. An engine control system comprising:

an electronic throttle control system having a throttle valve, an actuator for driving the throttle valve, and an electronic control unit wherein the throttle valve is controlled by the actuator in accordance with a target opening degree for the throttle valve, wherein the electronic control unit comprises:

a target value calculating portion for calculating a target value for an intake air amount or an intake pipe pressure;

a target opening degree calculating portion for calculating a target opening degree of the throttle valve; and a presumed value calculating portion for calculating a presumed value for the intake air amount or the intake pipe pressure, which can be realized by the calculated target opening degree, wherein the presumed value calculating portion calculates the presumed value for the intake air amount or the intake pipe pressure, based on the target opening degree of the throttle valve, to which a motion restriction is applied with respect to a control for the throttle valve;

wherein the presumed value calculating portion calculates the presumed value for the intake air amount or the intake pipe pressure, based on the throttle opening degree, to which the motion restriction is applied, and wherein a delay of response in an intake air system is taken into consideration, and the target opening degree calculating portion further comprises:

a calculating portion for calculating a deviation between the target intake pipe pressure and the presumed intake pipe pressure;

a compensating portion for compensating the deviation for the intake pipe pressure to an advancing side by an amount corresponding to the delay of the response in the intake air system;

a calculating portion for calculating an intake air amount passing through the throttle valve, based on the deviation compensated in the advancing side and the presumed intake air amount;

a calculating portion for calculating a throttle opening degree based on the calculated intake air amount passing through the throttle valve, such that the intake air amount passing through the throttle valve is realized by the throttle opening degree; and a calculating portion for calculating the target opening degree for the throttle valve by applying a motion restriction to the calculated throttle opening degree.

\* \* \* \* \*